(12) United States Patent
Takahashi (10) Patent No.: US 8,231,130 B2
(45) Date of Patent: Jul. 31, 2012

(54) MECHANICAL SEAL DEVICE (75) Inventor: Hidekazu Takahashi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 675 days.

(21) Appl. No.: 11/922,571

(22) PCT Filed: Jun. 14, 2006

(86) PCT No.: PCT/JP2006/311924
§ 371 (c)(1),
(2), (4) Date: Dec. 20, 2007

(87) PCT Pub. No.: WO2006/137305
PCT Pub. Date: Dec. 28, 2006

(65) Prior Publication Data
US 2009/0085300 A1 Apr. 2, 2009

(30) Foreign Application Priority Data

Jun. 20, 2005 (JP) .................. 2005-179599

(51) Int. Cl.
F16J 15/36 (2006.01)
(52) U.S. Cl. ......... 277/375; 277/392; 277/389; 277/408
(58) Field of Classification Search .................. 277/389, 277/391, 392, 375, 408
See application file for complete search history.

(56) References Cited

U.S. PATENT DOCUMENTS 2,096,329 A * 10/1937 Kagi .............................. 277/388
2,432,694 A * 12/1947 Snyder .......................... 277/372
2,474,123 A * 6/1949 Schmitz ........................ 277/373
3,051,497 A 8/1962 Wigg et al.
(Continued)

FOREIGN PATENT DOCUMENTS

EP 1 209 388 A2 5/2002
(Continued)

OTHER PUBLICATIONS

Petrochemical Equipment Design Construction Team of Shanghai Chemical Industry Design Institute, Mechanical Seal, p. 25, Fuel Chemical Industry Press, May 1974, Beijing.
(Continued)

Primary Examiner — Alison K Pickard
(74) Attorney, Agent, or Firm — Arent Fox LLP (57) ABSTRACT A mechanical seal having a seal cover capable of being installed on the outer surface around the circumferential surface of a hole of a seal housing and having an inner circumferential surface surrounding a shaft; a bellows having a first installation portion and a second installation portion, the first installation portion being formed by sealingly fitting the inner circumferential surface of the seal cover to one end circumferential surface of the bellows, the seconds installation portion being at the other end circumferential surface of the bellows, the first installation portion and the second installation portion forming a tubular portion between the portions, the tubular portion being formed as an elastic means surrounding the shaft; a stationary sealing ring sealingly installed on the circumferential surface of the second installation/portion and having an annular sealing surface pressed by the elastic means of the bellows; a rotating sealing ring having an annular relative sealing surface facing the sealing surface of the stationary sealing ring and slidably in intimate contact with the sealing surface of the stationary sealing ring; and a seal collar sealingly fitted and joined in the rotating sealing ring and also sealingly fitted on the shaft.

2 Claims, 4 Drawing Sheets

U.S. PATENT DOCUMENTS

| | | | |
|---|---|---|---|
| 3,091,469 A | 5/1963 | Matt | |
| 3,391,942 A | 7/1968 | Wilson | |
| 3,397,894 A * | 8/1968 | Mastriforte et al. | 277/391 |
| 3,515,394 A | 6/1970 | Stevens | |
| 3,526,408 A * | 9/1970 | Tracy | 277/379 |
| 4,136,887 A * | 1/1979 | Wentworth, Jr. | 277/374 |
| 4,175,753 A | 11/1979 | Wentworth, Jr. et al. | |
| 4,335,888 A * | 6/1982 | Ohba et al. | 277/306 |
| 4,453,722 A | 6/1984 | Swanson | |
| 4,744,721 A * | 5/1988 | Villeneuve | 415/113 |
| 5,823,539 A | 10/1998 | Rockwood | |
| 5,873,574 A * | 2/1999 | Ringer | 277/389 |
| 5,924,697 A | 7/1999 | Parker et al. | 277/369 |
| 5,954,341 A * | 9/1999 | Ringer et al. | 277/361 |
| 6,688,601 B2 * | 2/2004 | Takahashi | 277/358 |
| 2002/0060431 A1 | 5/2002 | Takahashi | |
| 2003/0042683 A1 | 3/2003 | Takahashi | |

FOREIGN PATENT DOCUMENTS

| | | |
|---|---|---|
| EP | 1 288 542 A2 | 3/2003 |
| EP | 1 288 541 B1 | 3/2008 |
| JP | 3-98375 | 10/1991 |
| JP | 3-98375 U | 10/1991 |
| JP | 04-151076 | 5/1992 |
| JP | 4-151076 A | 5/1992 |
| JP | 2002-156046 | 5/2002 |
| JP | 2002-156046 A | 5/2002 |
| JP | 2003-074713 | 3/2003 |
| JP | 2003-74713 A | 3/2003 |

OTHER PUBLICATIONS

Xiangfa Xu et al., Mechanical Seal Handbook, Southeast University Press, Oct. 1990 Nanjing.

Xihua Shen, Bellows Type Mechanical Seal, Hydrocarbon Processing Press, Mar. 1987 Beijing.

Chongqing Sub-Institute of China Scientific and Technical Information Institute, Mechanical Seal in Foreign Countries, Chongqing Sub-press of Scientific and Technical Literature Press, Apr. 1977 Chongqing.

* cited by examiner

MECHANICAL SEAL DEVICE

CROSS-REFERENCE TO RELATED APPLICATION

This application is a National Stage entry of International Application No. PCT/JP2006/311924, filed Jun. 14, 2006, the entire specification claims and drawings of which are incorporated herewith by reference.

TECHNICAL FIELD

The present invention relates generally to a mechanical seal device in which construction thereof is straightforward and a freely moveable one of a pair of seal rings thereof is able to operate as desired, and more particularly, a mechanical seal device of cartridge type which is suitable for sealing a sealed fluid with high viscosity, a sealed fluid containing slurry, a chemical fluid as sealed fluid and the like, and is able to predict solid matters in the sealed fluid from getting caught between the slide surfaces of the pair of seal rings or to predict occurrence of malfunction due to loading between the seal members.

BACKGROUND ART

As mechanical seal device is installed in apparatus for mass production or massive processing, such as automobiles or chemical apparatus, ease of installation and straightforwardness of assembly, disassembly and maintenance have been demanded in market. The mechanical seal device is requested to retain a construction for being able to reduce production cost thereof. Also as the mechanical seal device is used for sealing sealed fluid such as oils or chemical liquid, there have been demands for prevention of occurrence of operational troubles in sliding surfaces due to solidifications of the liquid as sealed fluid. In these years, the above technical background necessitates a simplification of the construction of the mechanical seal device, prevention of operational troubles of sliding surfaces and enhancement of durability of packing, O-ring and the like for sealing between part members.

Figure 4:
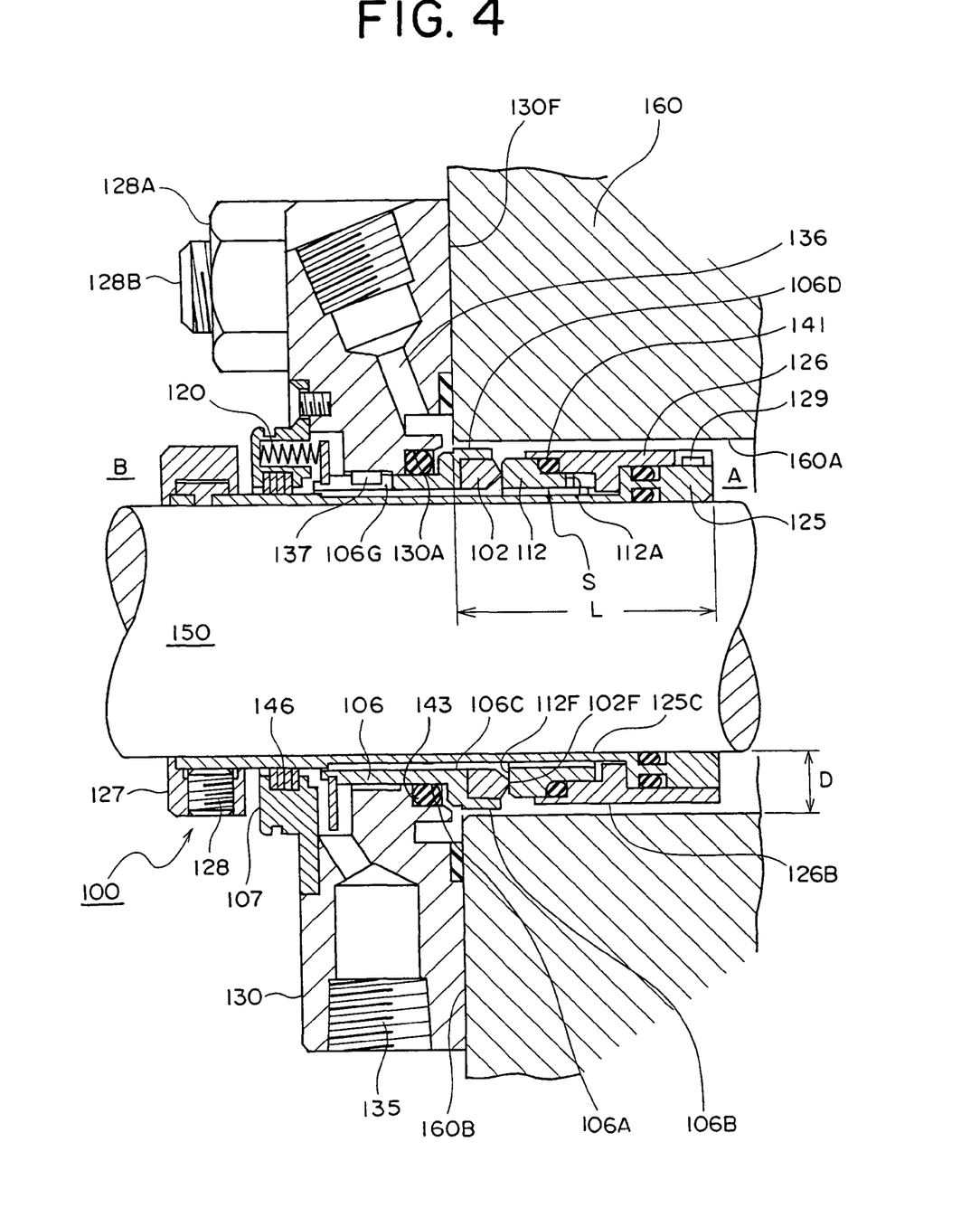
FIG. 4 is a full cross sectional view of a mechanical seal device as a prior art of the present invention.

Related prior art of the present invention is found as a mechanical seal device is shown in FIG. 4 which has a similar construction to the one disclosed in Patent Reference 1, given below. FIG. 4 illustrates a full cross section of a mechanical seal device 100 which is installed in a casing 160. The mechanical sea device 100 is utilized as a shafts seal apparatus of a pump which operates with chemical liquid and the like.

First, the construction of this mechanical seal device 100 will be explained briefly. In FIG. 4 the mechanical seal device 100 provides a seal between the casing 160 and a rotary shaft 150 which extends through within a bore diameter surface 160A (inboard "A") of the casing 160. Also the mechanical seal device 100 is provided in a cartridge type so as to be mounted on the end surface 160B of the casing 160 for easy installation. The mechanical seal device 100 includes a stationary seal ring 102 and a rotary sea ring 112 which are disposed within the bore diameter surface 160A. In addition, primary constitution members include a casing main body 130 and a sleeve 125 in which the casing body 130 retains the stationary seal ring (axially displaceable seal ring) 102 and retainer 106 thereof in the outboard "B" in relation to the casing 160 and the sleeve 125 retains the rotary seal ring 112 within the bore diameter surface 160A with which the rotary shaft 150 fittingly mates with a clearance gap formed therebetween.

The rotary seal ring 112 is mounted on one end portion located at the inboard "A" side of a long sleeve 125 in order to be disposed in the inboard "A" in relation to the bone diameter surface 160A of the casing 160. The other end portion of the sleeve 125 at the outboard "B" side is securely attached to a retainer portion 127 while a screw socket 128 in the retainer portion 127 is fastened so as to fix the retainer portion 127 with the rotary shaft 150. And the coupling of the rotary seal ring 112 and the sleeve 125 is realized by means of a coupling element 126. Respective fit clearances between the rotary shaft 150 and sleeve 125 and between the sleeve 125 and coupling member 126 dispose O-rings for sealing the clearances. And the sleeve 125 and the coupling member 126 are coupled by means of a drive pin 129 so as to rotate together. Furthermore, the coupling member 126 and the rotary seal ring 112 are coupled in a jointly rotatable relation by means of the drive pins locking in the U-shaped grooves 112A. In addition, the fit clearance between the coupling member 126 and the rotary seal ring 112 is provided a seal by O-ring 141.

The stationary seal ring 102, on the other hand, is securely attached to the annular surface with a step shoulder which is disposed at one end portion of the cylindrical retainer body 106. The retainer body 106 is retained in a non-rotatable manner while being freely moveable in the axial direction by means of a locking engagement between a fixation pin 137 disposed in the casing main body 130 and a long groove 106C disposed in the retainer body 106. The fit clearance between the retainer body 106 and the casings main body 130 which are freely moveable relative to each other is provided a seal by means of an O-ring 143 which is mounted between a first steps shoulder surface 106A of the retainer body 106 and a second step shoulder surface 130A of the casing main body 130. And the other end portion of the retainer body 106 fittingly receives and fixates a spring receiving portion.

End portion 130F of the casing main body 130 forms a contact with an end surface 160B of the casing 160 while the casing main body 130 is fixed to the casing 160 by means of stud bolts 128B anchored to the casing 160 with nuts 128A fastened. There is disposed a double step shoulder surface on the frontal end surface (side surface) of the casing main body 130. A spring seat member 107 is installed in the first step shoulder surface by means of set screw portion. A spring supported by the spring seat member 107 is disposed between the spring seat member 107 and a spring receiving portion. The stationary seal ring 102 is resiliently urged by the spring 120 by way of the spring receiving portion and the retainer body 106. The seal surface 102F of the stationary seal surface 102 urged by the spring 120 forms a seal-tight contact with the seal surface 112F of the rotary seal ring 112 for sealing a sealed fluid. There is disposed amount groove in the inner circumference of the spring seat member 107. This mount groove receives a spirally wound gasket 146 therein. The seal surface of this gasket 146 is in a seal-tight contact with the outer circumferential surface of the sleeve 126.

In order to cool the seal surfaces of the rotary seal ring 112 and the stationary seal ring 102, a flushing passage 136 and a quenching passage 135 extend in a communicating manner from the outer circumferential surface of the casing main body 130 to inner circumferential surface thereof in which the flushing passage 136 passes outer circumferential side of the rotary seal ring 112 and the stationary seal ring 102 while the quenching passage 135 passes inner circumferential surfaces of the rotary seal rings 112 and the stationary seal ring 102. Then the flushing passage 136 permits flushing fluid while the quenching passage 135 permits quenching fluid.

A mechanical seal device 100 thus configured which is required to dispose the rotary seal ring 112 in the inboard "A"

side in relation to the bore diameter surface 160A of the casing 160 necessitates a long sleeve 125 in order to fix the rotary seal ring 112 thereon. It also requires disposition of a flushing passage 136 and a quenching passage 135 in the case main body 130 for cleaning the outer circumferential surface of the rotary seal ring 112 and the stationary seal ring 102 by means of flushing fluid. It also needs to provide a cooling to the mechanical seal by supplying quenching fluid to the inner circumferential side of the rotary seal ring 112 and the stationary seal ring 102 which comprise the mechanical seal. A retainer body 106 also needs to be disposed in the stationary seal ring 102. A coupling member 126, at the same time, is necessarily disposed in the rotary seal ring 112. Therefore, the sleeve 125 necessarily becomes long toward inboard "A" side in relation to the bore diameter surface 160A of the casing 160. As the result, the flushing fluid which passes through the narrow passage formed at the outer circumferential surface side of the rotary seal ring 112 and the stationary seal ring 102 suffers from insufficient cleaning effect on the rotary seal ring 112 and the stationary seal ring 102. Likewise, the quenching fluid which passes through the narrow passage formed at the inner circumferential surface side of the rotary seal ring 112 and the stationary seal ring 102 suffers from insufficient quenching fluid flow and insufficient cooling effect on the rotary seal ring 112 and the stationary seal ring 102.

The bore diameter surface 160A typically cannot be chosen so large due to a structural constraint as a casing of machinery or apparatus. As the bore diameter surface 160A of the casing 160 often cannot be made large from the structural viewpoint. The rotary seal ring 112 and the stationary seal ring 102 necessarily become large in order to improve seal ability thereof, which in turn forces the space "S" in the inner circumference of the rotary seal ring 112 and the stationary seal ring 102 as well as the space between the bore diameter surface 160A and the outer circumferential surface of the rotary seal ring 112 and the stationary seal ring 102 to be arranged narrow and long. As the result, the foresaid cooling effect and cleaning effect become even worse. There is a possible threat that adhesive matters such as impurities produced from the sealed fluid may get caught between the seal surfaces 102F, 112F and on the seal surface of the O-ring 143 between the first step shoulder surface 106A and the second step shoulder surface 130A and may deteriorate seal performances of the seal surfaces 102F, 112F in a seal tight contact relation to each other and of the seal surface of the O-ring 143.

In particular, if reaction product of chemical liquid, slurry, high viscosity liquid and the like get caught between the O-ring 143 and the first step shoulder surface 106A or the second, step shoulder surface 130A, the adhesive matters make the O-ring 143 get stuck and accumulation of such adhesive matters makes displacement of the retainer body 106 difficult. If the displacement of the retainer body 106 becomes difficult, then the seal performance of the seal surfaces 102F, 112F in a contact relation to each other will decrease. Furthermore, the respective O-rings disposed more inward of the inboard "A" than the rotary seal ring 112 and the stationary seal ring 102 provide a seal to prevent the fluid from the quenching passage 135 from breaking into the inboard "A" and also provide a seal to prevent the sealed fluid within the bore diameter surface 160A from breaking into the quenching passage 135, hence complex construction for installing the respective O-rings. In particular, as some type of devices prohibit bore diameter surface 160A of the casing 110 in large diameter, the rotary seal ring 112 and the stationary seal ring 102 cannot be formed in larger dimensions in these cases. Thus, these cases fail to enhance the performance of the mechanical seal device 100.

Patent reference 1: Japanese Unexamined Patent Application Publication No. 2000-356270

DISCLOSURE OF THE INVENTION

Technical Problems to be Solved by the Invention

The present invention is proposed for alleviating the above mentioned disadvantages, and the technical problem to be solved by the invention is to enhance seal ability for keeping the seal surface of the rotary seal ring and the opposing seal surface of the stationary seal ring in a seal-tight contact relation irrespective of properties of sealed fluid including chemical liquid high viscosity liquid, liquid containing impurities or the like. Another object is to contain a bellows and a stationary seal ring within the seal cover and to make it possible to install the bellows irrespective of the size of the bellows. Yet another object is to make assembly, disassembly and maintenance of the mechanical seal device straightforward.

Means for Solving the Technical Problems

A primary object of the present invention is to solve the above mentioned technical problems, and a solution to such problems is embodied as follows.

A mechanical seal device related to the claim 1 of the present invention is a mechanical seal device for sealing a sealed fluid between a seal housing installing a shaft within a bore diameter surface and the shaft. The mechanical seal device is comprised of a seal cover beings attachable to an external surface at the end portion of the bore diameter surface in the seal housing and retaining an inner circumferential surface surrounding the shaft, a bellows having a first mounting portion at other circumferential end portion thereof and a second mounting portion at other circumferential end portion thereof, the first mounting portion attached to the inner circumferential surface of the seal cover in a sealing relation, wherein a cylindrical portion between the first mounting portion and the second mounting portion forms a resilient urging means, a stationary seal ring being mounted to the circumferential surface of the second mounting portion of the bellows and having a ring-formed seal surface, the seal surface being urged by the resilient urging means of the bellows, a rotary seal ring having a ring formed opposing seal surface, the opposing seal surface opposing and forming a seal-tight contact with the seal surface in a slidable manner, and a seal collar fitting and being coupled with the rotary seal ring in a sealing relation and being fittingly fixed with the shaft in a sealing relation.

Effects of the Invention

In the mechanical seal device related to the claim of the present invention, as the bellows which urges a seal ring, stationary seal ring or rotary seal ring, is disposed in the outboard side in relation to the seal housing, the bellows can be designed according to the necessary functions without restrictions of dimensions of the bore diameter surface of the seal housing. Therefore, an arbitrary outer diameter of the bellows or a specially formed spring means is able to enhance the seal performance by realizing an optimal urging surface pressure on the relatively opposing seal surfaces of the seal rings. Furthermore, even in case that the sealed fluid retains properties like chemical liquid, high viscosity liquid, liquid containing impurities and the like, the bellows which does not involve any relative displacement in the fit surfaces prevents impurities form getting caught between the relatively displacing surfaces, hence an optimal urging pressure given by the bellows to the seal rings. Therefore, the bellows provides a seal for the sealed fluid in relation to the outboard side and is able to exhibit outstanding seal performance by resiliently urging the seal surfaces of the seal rings over a longs period of time. Also as the mechanical seal device mounts the stationary seal ring and the rotary seal ring onto the seal cover and the seal collar at the outboard side of the seal housing, it is advantageous that the installation to the seal housing and disassembly, repair and maintenance of the mechanical seal device become straightforward.

DESCRIPTION OF REFERENCE NUMERALS

1 mechanical seal device
2 stationary seal ring (first seal ring)
2F seal surface
3A retainer
3A1 retainer surface
3B adapter
3B1 coupling surface
4 bellows
4B outer circumferential surface
4C inner circumferential surface
5 damper
6 casing
6A coupling portion
6B secure engagement surface
6B1 locking engagement surface
6C inner circumferential surface
6D notch portion
6G retainer groove
12 rotary seal ring (second seal ring)
12A end surface
12B pin-receiving recess portion
12C step shoulder surface
12F opposing seal surface
21 guide separation annulus
22 set plate
22A alignment portion
23 bolt
25 seal collar
25C secure engagement circumferential surface
30 seal cover
30A inner circumferential surface
30A1 fit engagement surface
30B flange portion
30D positioning portion
30F abutting surface
30G positioning groove
30S outer circumferential surface
35 flushing passage
36A quenching passage
36B drain port
36C drain port
40 fixation groove
45 gasket
50 rotary shaft
60 apparatus main body (casing)
60A bore diameter surface
60B external surface
A inboard
B outboard
S fluid chamber

BEST MODE FOR CARRYING OUT THE INVENTION

Described below is the details of the figures of a mechanical seal device as preferred embodiments in accordance with the principles of the present invention. All the figures explained below are constructed according to actual design drawings with accurate dimensional relations.

Figure 1:
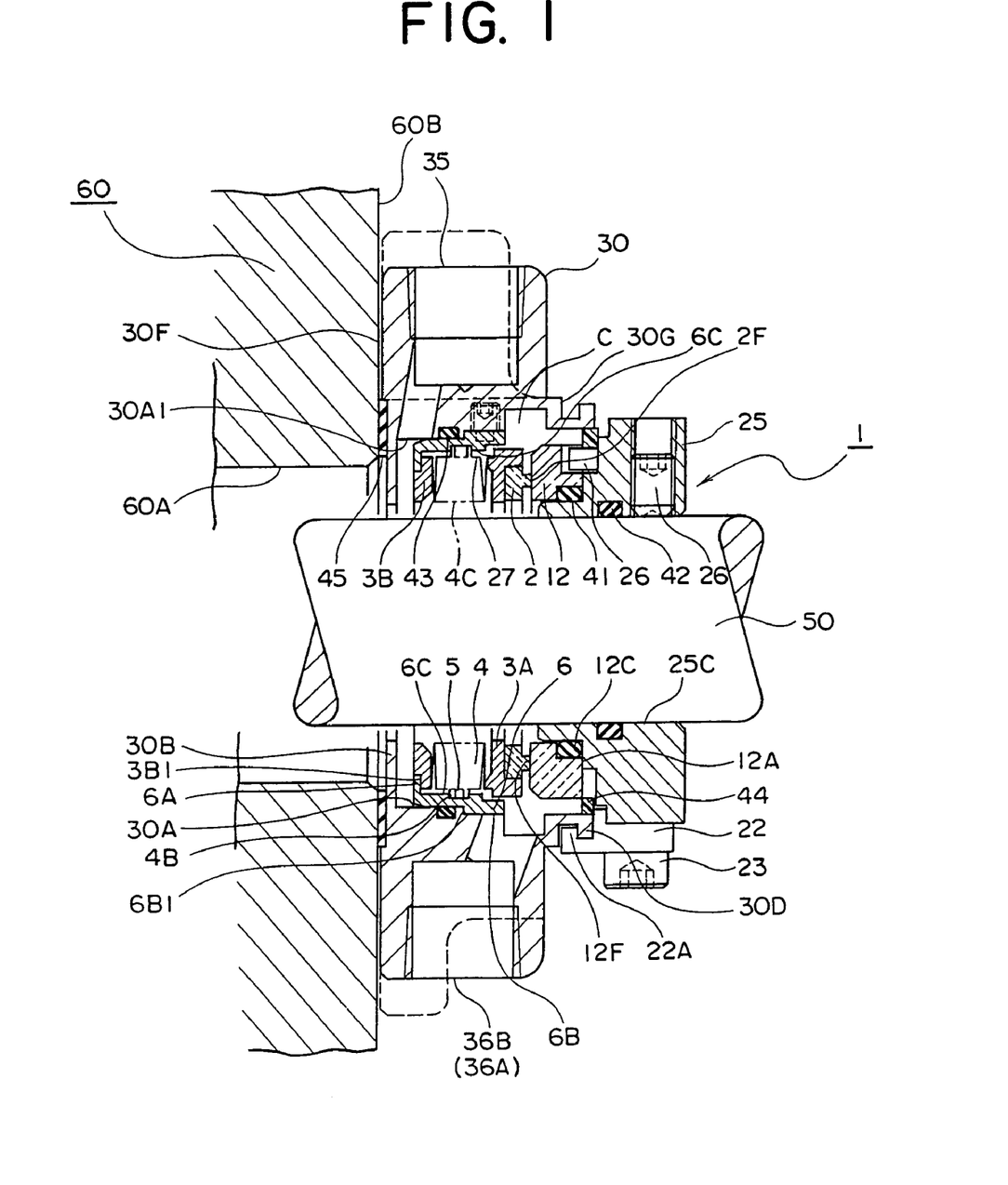
FIG. 1 is a full cross sectional view of a mechanical seal device as a first embodiment related to the present invention.
Figure 3:
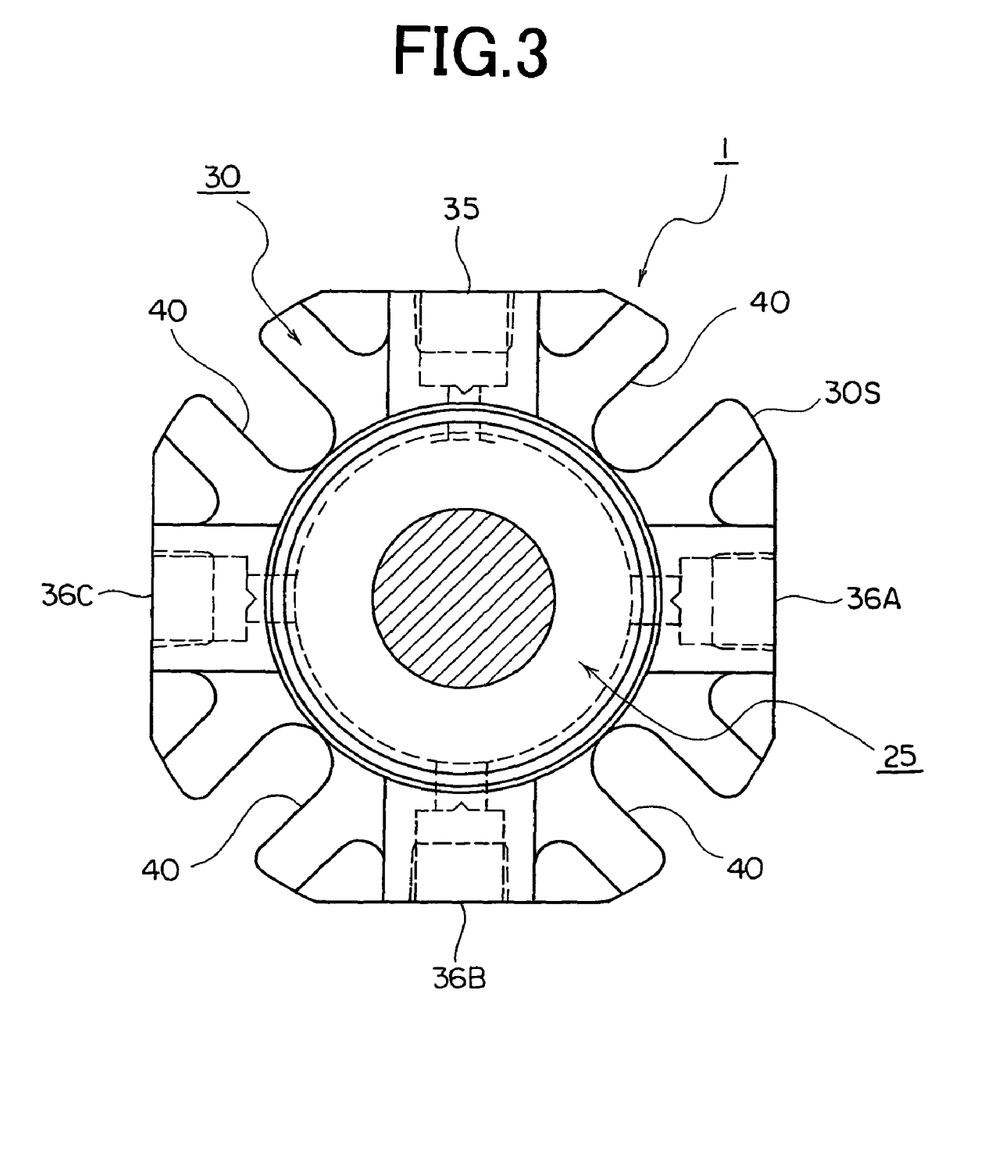
FIG. 3 is a front view of the mechanical seal device shown in FIG. 1 and FIG. 2.

FIG. 1 depicts a full cross sectional view of a mechanical seal device 1 related to the present invention being installed in a seal cover 30 for sealing between a apparatus main body (casing) 60 and a rotary shaft 50. FIG. 3 is a front view of the seal cover 30 and the seal collar 2 in FIG. 1 combined.

FIG. 1 shows a mechanical seal device 1 as a first embodiments relative to the present invention. There is disposed a rotary shaft 50 extending through within a bore diameter surface 60A of the apparatus main body (casing) 60. A seal cover 30 is mounted on an external surface 60B at the end portion of the bore diameter surface 60A of the apparatus main body 60. And besides this apparatus main body 60 retains four pieces of stud bolts, not shown but where indicated by the numeral 28 in FIG. 2, extending from the external surface 60B thereinto. Also the rotary shaft 50 mounted in the bore diameter surface is supported in freely rotatable a manner by means of bearings not shown. Inside the bore diameter surface 60A of the apparatus main body 60 defines an inboard "L" while opposite side of the apparatus main body 60 with respect to the seal cover 30 of (the mechanical seal device 1 defines an outboard "A" (see FIG. 2 for the portions indicated by the reference numerals "A" and "L").

Further details on the mechanical seal device 1 will be given below by referring to FIG. 1 and FIG. 3. The seal cover 30 whose abutting surface 30F is mounted onto the external surface 60B of the apparatus main body 60 has a square form as shown in FIG. 3. The seal cover 30 may have a circular form as well. The seal cover 30 has U-shaped fixture grooves which have four equally spaced open slots opening from the center toward four corners (see FIG. 3). The fixture grooves 40 of the seal cover 30 receive stud bolts, not shown, therein and fastening nuts on the stud bolts securely holds the seal cove 30 against the external surface 60B of the apparatus main body 60. The seal cover 30 also disposes an inner circumferential surface 30A in a surrounding relation to the axial center.

And a positioning portion 30 is disposed at the front surface of the fixed seal cover 30 which protrudes to the outboard "A" side. This positioning portion 30D then forms a positioning groove 30G on outer circumference thereof. A fit engagement surface 30A1 forming one step surface, an annular groove defining a fluid chamber "C" and a reduction surface being formed in the inner circumference of the positioning portion 30D are disposed in a sequential manner from the inboard "L" to the outboard "A". The cylindrical circumferential surface in the annular groove is located between the fit engagement surface 30A1 and the reduction surface and inner diameter thereof is arranged larger than the inner diameters of the fit engagement surface 30A1 and the reduction surface. Axial width dimensions of the cylindrical circumferential surface in the annular groove is set large enough to contain one end portion side including the seal surface 2F of the stationary seal ring 2 and another end portion side including the opposing seal surface 12F of the rotary seal ring 12 within the fluid chamber "C". In addition, the reduction surface is formed in the inner circumference of the positioning portion 30D in order to make the axial width of the annular groove large.

Also the seal cover 30 disposes not only quenching passages 36A, 36B communicating from outer circumferential surface 30S thereof (see FIG. 3) through the fluid chamber "C" but also drain port 36B or 36C communicating from the fluid chamber "C" through the outer circumferential surface 30S. One of the quenching passages 36B may be utilized as a drain port. These ports for the quenching passages 36A, 36B and the drain port 36C are provided with pipe thread to which piping, not shown, can be connected. Quenching fluid (clear water or the like) coming through the piping directly flows into the fluid chamber "C" from the quenching passages 36A, 36B and is provided to the outer circumferential side of the seal surface 2F and the opposing seal surface 12F in mutually sliding a relation to each other. Then a temperature increase due to slide frictional heat of the seal surfaces 2F and the opposing seal surface 12F can be lowered. At the same time, wear particles or the like caught on the seal surface 2F and the opposing seal surface 12F and released during the sliding movement can be cleansed. And the quenching liquid (clear water or the like) circulating in the fluid chamber "C" is discharged from the drain port 36C.

The seal cover 30 also disposes a flushing passage 35 which communicates from outer circumferential surface 30S thereof through the fit engagement surface 30A1 side in the inner circumferential surface 30A. Port of the flushing passage 35 also is provided with pipe thread to which piping, not shown, is connected. And flushing liquid (clear water) supplied intermittently from the flushing passage 35 provides a cleaning effect to the inner circumferential surfaces of the stationary seal ring (also known as first seal ring) 2 and the rotary seal ring also known as second seal ring) 12 which are in contact with the sealed fluid, and to the inner circumferential surface 4C of the bellows 4 which is also in contact with the sealed fluid. In particular, the flushing liquid (clear water) which is supplied from the flushing passage 35 is able to provide a cleaning and cooling effect to the inner side of the inner circumferential surface 4C of the bellows 4 and also the inner side of the inner circumferential surfaces of the stationary seal ring 2 and the rotary seal ring 12. Here what is meant by sealed fluid is chemical liquid high viscosity liquid, liquid containing fine particles, fluid with varying temperature or the like which is used within the apparatus main body 60.

Figure 2:
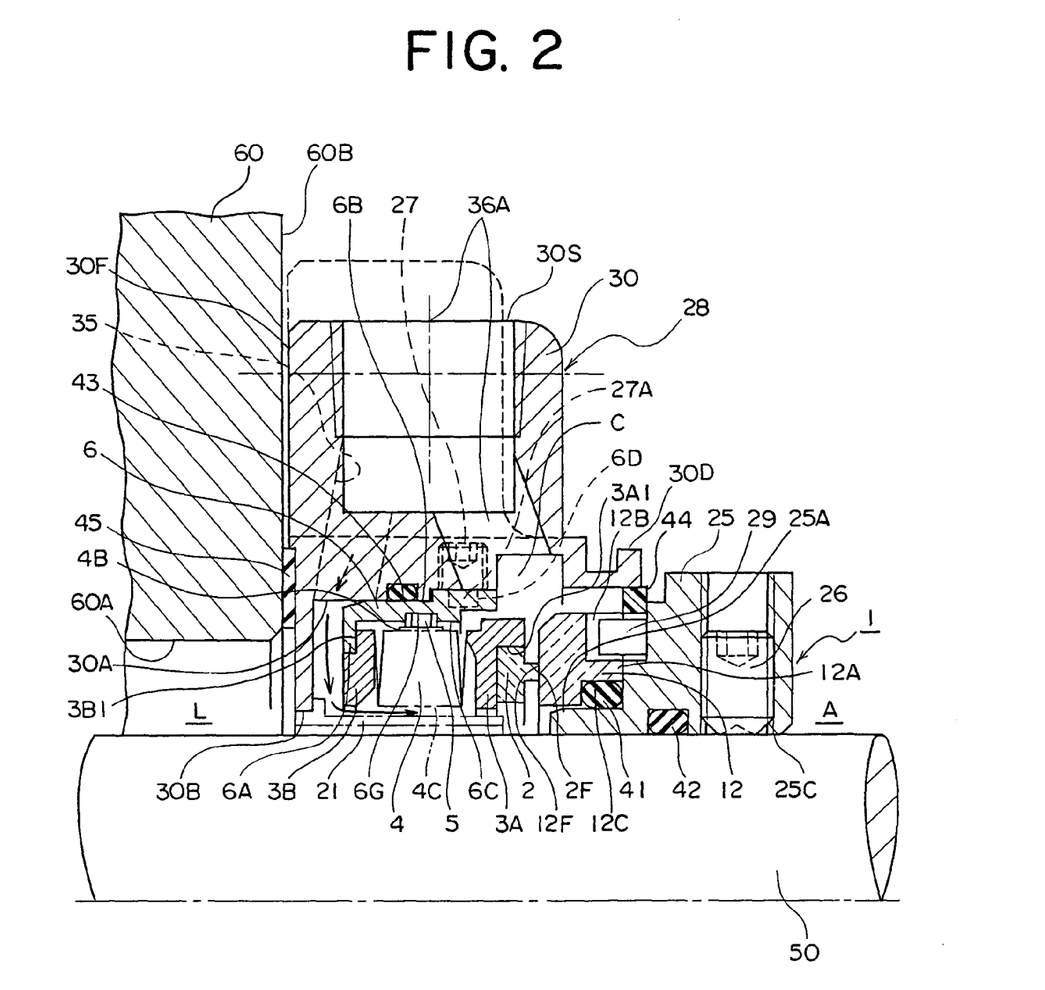
FIG. 2 is a cross sectional view of a half portion of a mechanical seal device as a second embodiment related to the present invention.

The following explanations will refer to the numerals in FIG. 2 as well. The fit engagement surface 30A1 formed in the inner circumference of the seal cover 30 securely fits the secure engagement surface 6B of the case 6. The case 6 disposes a coupling portion 6A at one end portions which forms a flange extending radially inward. This coupling portion 6A is welded with a coupling surface 3B1 formed at one axial end of the ring-shaped adaptor 3B such that the entire circumference is fully sealed. This adaptor 3B is welded to one end portions circumferential surface of the bellows 4 in a seal-tight relation which forms a first mounting portion. As this first mounting portion is integrated with the case 6, the case 6 can be formed as a portion of the first mounting portion. The bellows 4 is fabricated as an accordion-like annular ring by applying a reduction forming to a thin sheet metal of stainless steel, cupper alloy or the like. Alternatively ring-formed sheets can be welded at abutting inner diameter and outer diameter portions. Or resin material can be formed to an accordion-like cylindrical shape. And the cylindrical portion of the bellows 4 provides a spring means whose construction is arranged in such a way that a cross section between the inner circumferential surface 4C and the outer circumferential surface 4B has an undulated profile or a profile of inflected V-shape or Z-shape in continuity. This bellows 4 serves as a spring means which provides a resiliently urging force in the axial direction by means of reaction forces due to constituent elements of the bellows 4 bent in various manners. The other axial end portion of the bellows 4 is coupled at circumferential surface thereof with a ring-formed retainer 3A by welding or the like in a seal-tight relation, which defines a second mounting portion. A retainer surface 3A1 (see FIG. 2) formed at the end portion of the retainer 3A is coupled with the back surface of the stationary seal ring 2 in a seal-tight relation.

And besides, a front surface of the stationary seal ring 2 defines a seal surface 2F. The case 6 then forms a secure engagement surface 6B on outer circumference thereof. This secure engagement surface 6B has a step shoulder surface which defines a lock engagement surface 6B1. And the case 6 is fixed to prevent movement thereof by locking this lock engagement surface 6B1 with a step-shoulder surface formed in the fit engagement surface 30A1. A first seal groove for the O-ring providing a seal between the secure engagement surface 6B and the fit engagement surface 30A1 receives stationary O-ring (seal ring) 43 therein. This O-ring 43 is made of Fluoride Rubber Nitrile Rubber, H-NBR, EPDM Perfluoroelastomer or the like. Furthermore, there is disposed a retainer groove 6G in the inner circumferential surface 6C of the case 6. A damper 5 which consists of a holding plate like a leaf spring installed in the retainer groove 6G retains the outer circumferential surface 4A of the bellows 4, which prevents the bellows 4 from swinging when the rotary shaft 50 and the like exerts a rotational force or vibratory force thereto. Also there is disposed a recess like notch portion 6D in the outer circumference of the case 6 to the fluid chamber "C" side. Then a female thread is formed which reaches from the outer circumferential surface 30S of the seal cover 30 to the notch portion 6D. A set screw 27 is fastened against this female thread until an engagement portion 27A at the end tip of the set screw 27 reaches the notch portion 6D such that the case 6 does not rotate together with the rotary shaft 50.

The entire inner circumferential surface, which covers inner circumferential surface of the adaptor 3B, inner circumferential surface 4C of the bellows 4 and inner circumferential surface of the stationary seal ring 2, creates a passageway for the flushing liquid coming from the flushing passage 35 in a cavity formed in relation to the outer circumferential surface of the rotary shaft 50. Injection of the flushing liquid prevents viscous sealed fluid or sold matters contained in sealed fluid from getting caught on the inner circumferential surface 4C of the bellows 4, the inner circumferential surface of the stationary seal ring 2 and the inner circumferential surface of the rotary seal ring 12. This stationary seal ring 2 is fabricated from silicon carbide, carbon, ceramics and the like.

The seal collar 25, on the other hand, disposes a second seal groove in the secure engagement circumferential surface 25G located in inner circumference thereof. The secure engagement circumferential surface 25C is securely attached to the outer circumferential surface of the rotary shaft 50 while the O-ring 42 provide a seal to the clearance between the engagement surfaces of both members. Also an end tip portion of the set screw 26 fastened in the seal collar 25 abuts the outer diameter surface of the rotary shaft for fixing the seal collar in relation to the rotary shaft 50. And a coupling surface 25A is disposed on the outer circumferential surface of the protruding portion sticking out from radially inward portion of the seal collar 25 to the rotary seal rings 12 side. There is further disposed a step shouldered circumferential surface in which the step is formed radially outward, being perpendicular to the coupling surface 25A of the seal collar 25. Then a drive pin 29 is press fit into a pin bore which is disposed in the step shouldered circumferential surface of the seal collar 25.

Front end of the rotary seal ring 12 forms an opposing seal surface 12F for sliding movement. This opposing seal surface 12F is not only in a seal-tight contact relation with the seal surface 2A of the stationary seal ring 2 but also is ready for sliding movement. Outer circumference of the rotary seal ring 12 disposes a seal-tight surface. There is disposed a seal ring 44 for providing a seal to the clearance gap between the seal-tight surface and the inner circumferential surface of the positioning portion 30D. The seal ring 44 for sealing between the seal-tight surface and the opposing inner circumferential surface prevents quenching liquid supplied from the quenching passage 36A from leaking to the outboard "A". In addition, the inner circumference of the rotary seal ring 12 disposes a step shoulder surface 12C for O-ring. O-ring 41 is installed in a cavity which is formed between the step shoulder surface 12C of the rotary seal ring 12 and the coupling surface 25A of the seal collar 25. Thus, the clearance between the engagement surfaces of the coupling surface 25A and the step shoulder surface 12C of the rotary seal ring 12 is provided a seal thereto. There is also disposed a pin-receiving recess portion 12B in the end surface 12A outboard "A" side of the rotary seal ring 12. This pin-receiving recess portion 12B receives a drive pin 29 disposed in the seal collar 25 in order to create a lock engagement between both elements of the rotary seal ring 12 and the seal collar 25 for preventing a relative rotational movement. And the drive pin 29 transmits a rotational force of the seal collar 25 to the rotary seal ring 12. This rotary seal ring 12 is fabricated from silicon-carbide, carbon, ceramics and the like.

The seal cover 30 forms a flange portion 30B which extends from the flushing passage 35 towards the inboard "L" side so as to come to a close proximity of the rotary shaft 50, which guides the flushing fluid (clean water) injected from the flushing passage 35 for flowing inside the inner circumferential surface 4C of the bellows 4 and reaching inside the inner circumferential surface of the stationary seal ring 2 and the inner circumferential surface of a portion of the rotary seal ring 12. In order for that the flushing fluid (clean water) from the flushing passage 35 be promoted effectively by the gasket 45 between the seal cover 30 and the apparatus main body 60 to reach inside the inner circumferential surface of the rotary seal ring as well as inside the inner circumferential surface of the stationary seal ring 2, the inner diameter surface of the ring formed gasket 45 should preferably be brought in a close proximity of the rotary shaft 50.

The reason why the gasket 45 can be brought to as close proximity of the rotary shaft 50 is that the gasket 45 being made of a rubber-like resilient material will not cause any wear or damage even in a case of contact with each other as seen in a metal-to-metal contact. This gasket 45 is fabricated from rubber, resin, soft metal covered by a rubber layer and the like. Flushing liquid supplied from the flushing passage 35 is blocked and forced to change the direction by the flange portion 30B such that the liquid passes through a passage between the inner circumferential surface 4C of the bellows 4 and the rotary shaft 50 and cleans high viscosity liquid or solid matters caught on the inner circumferential surface of the rotary seal ring 12 as well as on the inner circumferential surface of the stationary seal ring 2. Sliding surfaces of the mutually sliding seal surface 2F and opposing seat surface 12F are cleaned by means of the flushing liquid entering from radially inward with the help of a centrifugal force and are provided a lubrication effect for sliding movement of the seal surface 2F and the opposing seal surface 12F as well.

The fluid chamber "C" in the seal cover 30 should preferably be arranged axially long enough to cover the major portion of the stationary seal ring 2 and the rotary seal ring 12. In order to make the fluid chamber "C" large, outer diameter surface (bottom surface of the groove) of the annular groove should be arranged in a large diameter. And the quenching liquid supplied from the quenching passages 36A, 36B is arranged to be injected directly onto the outer circumferential side of the seal surface 2F and the opposing seal surface 12F. Even when the seal surface 2F of the stationary seal ring 2 and the opposing seal surface 12F of the rotary seal ring 12 generate heat due to relative sliding friction, since the width of the annular groove is formed large enough to cover the outer circumference of the stationary seal ring 2 and the rotary seal ring 12, the quenching liquid flow for cooling or cleaning passing through the fluid chamber "C" is expected to be able to decrease the heat temperature.

The set plate 22 is mounted to the seal collar 25 and assembled by means of bolts 23 while the protruding alignment portion 22A of the set plate 22 engages the positioning groove 30G of the seal cover 25 for positioning. The seal collar 25 is then fixed with the rotary shaft 50 by fastening the socket screw 26 after the rotary seal ring 2 coupled with seal collar 25 is aligned with respect to the stationary seal ring 2. The set plates 22 are mounted onto the circumference of the seal collar 25 at three equally spaced locations. The set plates 22 should be removed after the completion of assembly.

The mechanical seal device 1 thus constructed contains the stationary seal ring 2 and the bellows 4 therewithin in which the bellows 4 installed in the inner circumferential surface 30A of the seal cover 30 exerts an urging force to the stationary seal ring 2 and provides a seal between the stationary seal ring 2 and the adapter 3B. Therefore, unlike the bore diameter surface 60A of the seal housing 60 which is a part of machinery or apparatus, the inner circumferential surface 30A of the attachable seal cover 30 is not restricted by dimensional constraints in relation to other design configurations, hence an arbitrary dimensional choice based on design calculations of the inner circumferential surface 30A in accordance with the bellows 4. As the result, performance of the bellows 4 for resiliently urging the stationary seal ring 2 will be enhanced. Also seal ability of the seal surface 2F of the stationary seal ring 2 and the opposing seal surface 12F of the rotary seal ring 12 can be improved because of their seal tight contact. Furthermore, prevention of wear of the seal surfaces 2F, 12F under sliding movement can also be expected. And besides, the construction is simplified as the bellows 4 and the stationary seal ring 2 are contained within the seal cover 30 and no conventional sleeve is needed for installing seal rings. Fabrication cost can also be reduced at the same time.

FIG. 2 is a cross-sectional view of a half portion of a mechanical seal device 1 as a second embodiment related to the present invention. In the mechanical seal device 1 show in FIG. 1, one end portion of a guide separation annulus 21 in a cylindrical form is coupled with the inner diameter portion of the flange portion 30B extending radially inward from the seal cover 30. And the outer circumferential surface of the guide separation annulus 21 is arranged so as to form a fluid passageway in conjunction with the inner circumferential surface of the adaptor 3B, the inner circumferential surface 4C of the bellows 4 and the inner circumferential surface of the retainer 3A. This fluid passageway communicates the flushing passage 35 via a passageway formed between the flange portion 30B and the adaptor 3B.

Therefore, even in case of sealed fluid being high viscosity fluid or fluid containing chemical liquid or impurities, flushing liquid injected from the flushing passage 35 not only cleans the inner circumferential surface 4C of the bellows 4 but also cleans the inner circumferential side of the seal surface 2F and the opposing seal surface 12F. Also it can effectively prevent high viscosity fluid from sticking between the seal surface 2F and the opposing seals surface 12F. As the result, seal performances of the relatively sliding seal surfaces 2F, 12F can be enhanced. At the same time, even with the sealed fluid retaining properties such as high viscosity or impurity inclusion, a resilient urging force of the bellows 4 is able to urge the seal surface 2F of the stationary seal ring 2 against the opposing seal surface 12F in a seal tight relation. Other configurations are more or less the same as those explained for FIG. 1. Front view of FIG. 2 is the same as that in FIG. 3.

The foresaid mechanical seal device 1 explains an example in which a stationary seal ring 2 is attached to a bellows 4. However, as a mechanical seal device 1 of a third embodiment, not shown, the first mounting portion at one end of the bellows 4 is attached to the seal collar 25 while the second mounting portion is attached to the rotary seal ring 12, instead. Also the stationary seal ring 2 is securely fitted to the inner circumferential surface 6C of the case 6. Then the seal surface 2F of the stationary seal ring 2 and the opposing seal surface 12F of the rotary seal ring 122 are brought to a seal-tight contact to each other. Other configurations are more or less the same as those in FIG. 1. Advantages of the mechanical seal device 1 are the same as those mentioned for FIG. 1.

Construction and advantages of inventions in other embodiments related to the present invention will be described below.

In a mechanical seal device of the first invention relative to the present invention, a seal cover retains a flange portion at seal housing side thereof which extends radially inward in a surrounding relation relative to the rotary shaft and retains a flushing passage which communicates a passageway passing between the flange portion and the first mounting portion and passing within the inner circumferential surface of the bellows.

According to the mechanical seal device of the first invention, as a seal cover retains a flange portion at seal housing side thereof which extends radially inward in a surrounding relation relative to the rotary shaft and also retains a flushing passage which communicates a passageway passing between the flange portion and the first mounting portion and passing within the inner circumferential surface of the bellows, when flushing liquid is injected from the flushing passage the sealed fluid is blocked by the flange portion and the flushing fluid prevents the sealed fluid from breaking into the seal ring side, and is able to securely clean the surfaces of the bellows stationary seal ring and rotary seal ring which are important surfaces from the operation point of view. As the result, troubles with bellows due to chemical liquid, high viscosity liquid, liquid-containing impurities and the like can be prevented while wear of the seal surfaces due to impurities caught between the opposing seal surfaces can also be prevented in an effective manner.

In a mechanical seal device of the second invention relative to the present invention, a guide separation annulus is disposed at the inner circumferential end portion of the flange portion which forms a passageway in conjunction with the inner circumferential surface of the bellows.

According to the mechanical seal device of the second invention, as a guide separation annulus is coupled with the inner circumferential end portion of the flange portion in order to form a passageway in conjunction with the inner circumferential surface of the bellows the flushing liquid prevents chemical liquid, liquid containing slurry and the like from breaking into the inner circumferential surface of the bellows and is able to provide an intensive cleaning effect to the inner circumferential surface of the bellows. In addition, the flushing liquid is injected onto the inner circumferential surfaces of the stationary seal ring and the rotary seal ring for a cleaning effect and also is able to provide a strong cooling effect against slide friction heat of the seal surfaces.

In a mechanical seal device of the third or fourth invention relative to the present invention, the first mounting portion retains a case which is coupled with the inner circumferential surface of the seal cover in freely detachable a manner and is locked in a rotational direction.

According to the mechanical seal device of the third or fourth invention, as the first mounting portion retains a case which is coupled with the inner circumferential surface of the seal cover in freely detachable a manner and is locked in a rotational direction, it becomes straightforward to assemble and disassemble the bellows or the stationary seal ring. Even in case of some trouble with O-ring between the case and the seal cover caused by chemical liquid, it is advantageous that replacement of the O-ring is straightforward.

INDUSTRIAL APPLICABILITY

As described so far a mechanical seal device of the present invention is advantageous in that the mechanical seal device is always able to urge at a prescribed pressure regardless of sealed fluid with high viscosity or containing impurities. The mechanical seal device is also advantageous in that the seal cover is able to contain a multitude of functions therewithin. The mechanical seal device is further advantageous in that the seal cover contains the entirety therewithin and maintenance thereof is easy while installation thereof is simple.

The invention claimed is:

1. A mechanical seal device disposed in an outboard side relative to an external surface of an end portion of a bore diameter surface in a seal housing for sealing a sealed fluid between said seal housing installing a shaft within said bore diameter surface and said shaft, said mechanical seal device comprising:

a seal cover being attachable to said external surface of said seal housing and retaining an inner circumferential surface surrounding said shaft, a fit engagement surface being formed on said inner circumferential surface, an annular groove configured to be larger than said fit engagement surface and being formed on said inner circumferential surface, and a flange portion extending radially inward in a surrounding relation relative to said shaft at said seal housing side;

a bellows having a first mounting portion and a second mounting portion, wherein a cylindrical portion between said first mounting portion and said second mounting portion forms a resilient urging means;

a case retaining a coupling portion which is formed on an inner circumference thereof and which couples with said first mounting portion and a lock engagement surface which is formed on an outer circumference thereof and which couples with said fit engagement surface of said seal cover in a freely detachable manner along an axial direction of said shaft, and houses an outer circumferential surface of said bellows;

a stationary seal ring being sealingly mounted to the circumferential surface of said second mounting portion of said bellows and having a ring formed seal surface, said seal surface being urged by the resilient urging means of said bellows;

a rotary seal ring having a ring formed opposing seal surface, said opposing seal surface opposing and forming a seal tight contact with said seal surface in a slidable manner; and a seal collar fitting and being coupled with said rotary seal ring in a sealing relation and being fittingly fixed with said shaft in a sealing relation, wherein said seal cover is provided with a flushing passage configured to supply flushing fluid and a quenching passage configured to supply quenching fluid, a passageway defined between said flange portion and a said first mounting portion, and which communicates with a said flushing passage, and a fluid chamber (C) is defined between said annular groove of said seal cover, said stationary seal ring, and said rotary seal ring, and which communicates with said quenching passage.

2. A mechanical seal device as claimed in claim 1 wherein a guide separation annulus is retained in the inner circumferential end portion of said flange portion and said guide separation annulus forms said passageway in conjunction with the inner circumferential surface of said bellows.

* * * * *